Jan. 8, 1963 H. S. HEMSTREET ET AL 3,072,011

INTERFEROMETER OPTICAL SYSTEM

Filed May 24, 1957 7 Sheets-Sheet 1

INVENTOR

BY Darby & Darby

ATTORNEYS

INTERFEROMETER OPTICAL SYSTEM

Filed May 24, 1957 7 Sheets-Sheet 2

INVENTOR

BY Darby & Darby

ATTORNEYS

Jan. 8, 1963 H. S. HEMSTREET ET AL 3,072,011

INTERFEROMETER OPTICAL SYSTEM

Filed May 24, 1957 7 Sheets-Sheet 3

INVENTOR

BY Darby & Darby

ATTORNEYS

Jan. 8, 1963 H. S. HEMSTREET ET AL 3,072,011
INTERFEROMETER OPTICAL SYSTEM
Filed May 24, 1957 7 Sheets-Sheet 4
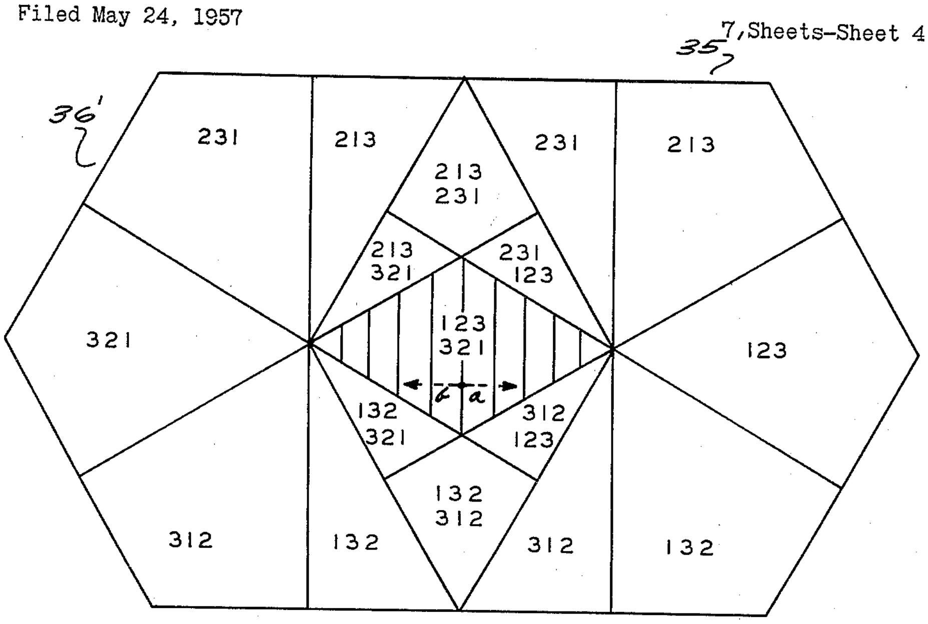
4 A
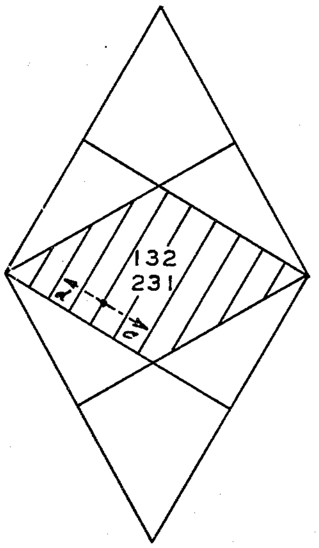
4 B
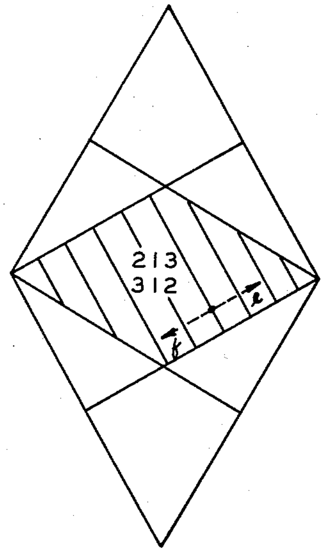
4 C
INVENTOR
BY Darby & Darby
ATTORNEYS Jan. 8, 1963 H. S. HEMSTREET ET AL 3,072,011

INTERFEROMETER OPTICAL SYSTEM

Filed May 24, 1957 7 Sheets-Sheet 5

INVENTOR

BY Darby & Darby

ATTORNEYS

Jan. 8, 1963 H. S. HEMSTREET ET AL 3,072,011

INTERFEROMETER OPTICAL SYSTEM

Filed May 24, 1957 7 Sheets-Sheet 6

INVENTOR

BY Darby & Darby

ATTORNEYS

Jan. 8, 1963 H. S. HEMSTREET ET AL 3,072,011

INTERFEROMETER OPTICAL SYSTEM

Filed May 24, 1957 7 Sheets-Sheet 7

INVENTOR

BY Darby & Darby

ATTORNEYS 3,072,011

INTERFEROMETER OPTICAL SYSTEM

Harold S. Hemstreet, Binghamton, and Robert A. Woodson, Vestal, N.Y., assignors to General Precision, Inc., a corporation of Delaware Filed May 24, 1957, Ser. No. 661,540
15 Claims. (Cl. 88—14)

The present invention relates to optical interferometric measuring devices and, more particularly, to an improved optical measuring method and means involving reflective surfaces at right angles such as cube corner prisms.

Cube corner prisms may be defined as comprising three mutually perpendicular reflecting surfaces and a transmitting (non-reflective) face. The cube corner prism is a particularly useful component in optical systems by reason of the fact that a light ray striking these three mutually perpendicular plane reflecting surfaces in succession will return in a path which is parallel to its original direction in a manner substantially independent of the orientation of the cube corner prism with respect to the incident light ray. Because of these properties the cube corner prism is often used in practical applications where it is important to provide for the reflection of light rays in a path parallel to the incident ray and where a constant path length for these rays is required. By way of example, the linear interferometric measuring device disclosed in Patent No. 2,583,596 by Elihu Root III requires a fixed and a movable reflecting surface for reflecting two light beams which have been split from a beamed light source prior to being directed toward these reflecting surfaces, and which are recombined following these reflections. The movement (change of path length) of one movable reflective surface with respect to the other may be measured by an inspection of the fringe pattern formed in the recombined beam. However, if the reflected light rays from either of the two reflective surfaces do not follow a path parallel to the respective incident rays due to improper orientation of that surface, the fringe pattern of the recombined beam is altered and the accuracy of the measuring device is impaired. For this reason, the patent cited above illustrates the use of cube corner prisms as the fixed and movable reflective surfaces to overcome the need for their critical orientation.

As illustrated in Patent No. 2,571,937 by E. R. Peck, the substitution of cube corner prisms for flat reflective surfaces is even more helpful for interferometric angle measuring devices inasmuch as the measuring operation inherently reorients the reflective members commensurate with the magnitude of the angle being measured. Yet it is the relative linear position of the reflective members that is important to the measurement in Peck's instrument.

Many other practical applications use cube corner prisms by reason of their ability to reflect essentially all of the incident light energy in a path which is parallel to its incident direction over wide ranges of orientation. For example, they are often included in survival kits for signalling in the direction of a flare. They also have been used as a reflective device in optical radar applications which use Doppler shift techniques with electromagnetic energy in the visual spectrum.

Looking directly into the face of a cube corner prism, all light rays passing therein (with certain exceptions) will strike the three reflective sides successively in an order dependent on the portion of the face they pass through. The exceptions occur when the light rays pass into the face near enough to one of the three corners of the cube corner that on their reflection from either the first or second reflective surface they strike such that they impinge upon the face before striking the remaining reflective side or sides and become ineffective. Thus looking into the face of a cube corner the view of the effective area of a cube corner gives the appearance of a hexagon (a portion of each of the corners being effectively cut off). Further, this area with the appearance of a hexagon is divided into six portions by the three lines of intersection of the three reflective surfaces of the cube corner disposed about 120 degrees apart and their image as seen through the face of the prism. More particularly, the image of these three lines of intersection gives the appearance that they have each been extended to bisect the area of the portion defined by the other two lines of intersection with the result that the hexagon appears to be divided into six portions known as kite apertures. These kite apertures will be described in great detail below and are significant in that all light rays incident to the face of the cube corner within the same kite aperture will strike the same reflective surfaces of the cube corner in the same order before emerging from the face. Moreover, each of the six kite apertures represent a different order or permutation of the cube corner reflective surfaces for light rays passing through that portion of the face. It should be noted that there are six possible permutations of three of the three reflective surfaces of a cube corner and each kite aperture represents one of these permutations. Further, the order of striking the reflective surfaces for light rays entering three of these kite apertures is precisely the reverse of the order of striking the reflective surfaces for light rays entering the other three kite apertures.

Since the desirable characteristic of a cube corner prism is dependent on the fact that the three reflective surfaces are mutually perpendicular, any deviation from this relationship causes the reflected rays to be non-parallel to the incident rays. This non-parallelism is known as angle error. Production techniques of cube corner prisms, of course, determine the degree to which these surfaces fall short of being mutually perpendicular. Inherent in their production is the requirement of measurement of magnitudes and direction of this angle error condition. It should be noted, however, that non-parallelism resulting from angle error in a cube corner prism is very small compared to the errors which would result from using plane reflecting surfaces in their place such that the decision to use cube corner prisms over plane reflective surfaces is not affected by the existence of angle error. Further, since, as a practical matter, the costs and available production techniques prevent these cube corner prisms from being perfect, their application to very critical optical systems has to be such as to minimize this non-parallelism. For example, the copending application No. 609,467 now Patent No. 2,977,841, entitled "Interferometer Optical System" filed on September 12, 1956, by John Kaufmann et al., and assigned to the same assignee as the present invention, discloses the general optical measuring techniques utilizing reflective cube corner prisms as disclosed in the Elihu Root III patent, referred to above, except that the reflective prisms are selected to have equal angle error for the particular orientation utilized. A separate recombining means located at the intersection of the reflected light rays is then used for the recombination. It is only when one uses essentially perfect cube corner prisms or prisms with essentially matched angle errors for the reflective members of such an interferometer that a single beam splitting surface can be used for both beam dividing and recombining. Moreover, even with a two-piece beam splitter, having one surface for beam dividing and another for recombining, it is necessary to match the angle errors (if any) of the prisms. Thus, it is desirable to be able to measure the lack of mutual perpendicularity between the reflective surfaces of a cube corner for both their manufacture, to decrease angle error, and for matching purposes (in practical applications) in optical interferometric measuring systems.

Looking into the face of a cube corner, the angle between the incident rays entering the face of the cube corner in an area defined by one of the kite apertures discussed above and their respective reflected rays may be represented as a vector, the length of which is a measure of the magnitude and the direction of which represents the orientation of the angle error resulting from the light rays striking non-mutually perpendicular reflective surfaces in the order characteristic of the particular kite. Meanwhile, the angle error between the incident light rays entering the face of the cube corner in an area defined by a second adjacent kite aperture and their respective reflected rays may be represented by still another vector since the different order of striking the non-mutually perpendicular surfaces will probably result in an angle error with a different magnitude and orientation. Further, the angle error between the incident light rays entering the face of the cube corner in an area defined by a third kite aperture, adjacent to the second kite aperture, and their respective reflected rays may be represented by still another vector since the particular order of striking the non-mutually perpendicular surfaces associated with this kite aperture will probably result in an angle error with a different magnitude and direction than the other two kite apertures. Light rays entering through each of the three remaining kite apertures strike the three reflective surfaces in the reverse order compared to light rays entering each of the three diametrically positioned kite apertures referred to above. This correspondence is known as optical symmetry. Likewise, for the same reasons, if a cube corner prism is successively reoriented by 60 degree increments three times in the plane parallel to its face, the same light ray will pass through successive adjacent kite apertures and strike the three reflective surfaces in a different order for each orientation. Depending on the non-perpendicularity of these three reflective surfaces, the angle error and vector representation may well differ for each orientation as in the above analysis. The optical symmetry heretofore mentioned allows the angle error encountered by the incident light ray in the first three orientations to completely identify the non-mutual perpendicularity of the reflective surfaces of the cube corner without further reorientation.

The prior art has, for the most part, as already suggested above, been reconciled to the existence of angle error in prisms, and has, as exemplified in the above-identified copending application of John Kaufmann, et al., substituted and reoriented prisms in linear interferometric measuring instruments in order to find by "trial and error" a pair of prisms having equal or approximately equal angle errors for any two of their kite apertures. With a pair of prisms matched for two of the three angle error quantities, a recombining means separate from the beam splitter and independently oriented may be equivalent to a pair of cube corner prisms which are matched for all three angle error quantities. In this way an optimum interference pattern may be formed in the recombined beam commensurate with the linear measurement being made notwithstanding the existence of angle errors in the prisms.

As will be obvious, the matching by trial and error in the instruments described and identified above is cumbersome, time consuming, and uneconomical at best. It is desirable to be able to measure the angle errors, of cube corner prisms individually in any of their several orientations so that matches may be made with certainty. One known method would be the modified Twyman-Green interferometer described on pages 446 and 447 of a book entitled "Prism and Lens Making" by F. Twyman, second edition, 1952, published by Hilger & Watts, Ltd., Hilger Division, 9851 Pancras Way, London N.W.

In this interferometer a light beam from a source is split in intensity such that one half is directed normally toward a flat reflecting surface and the other half is directed toward one half of the aperture of a cube corner prism. A second flat reflecting surface faces the other half of the aperture of the cube corner prism and is adjusted to be normal to the light incident upon it from one of the emerging bundles. The reflected beams are then recombined and the fringe pattern observed. The errors in two of the three angles of the prism can be found by interpreting the fringe patterns seen. The error in the other angle may be found by repeating the test with a different prism orientation. Although this method provides quantitative measurement of the angle errors it has the disadvantage for production testing of requiring time consuming adjustments to get the proper configuration of fringes and to interpret them for matching purposes.

Accordingly, the present invention seeks to avoid the difficulties encountered in measuring and matching angle errors in cube corner prisms by the other methods described. The principle of the interferometer is to pass two parallel light beams (originally one beam which is split in intensity by a beam splitter) through a test cube corner prism in opposing directions and then to recombine the beams to give an interference pattern which represents the doubled angle errors in the prism.

Fringes due to these angle errors appear within the overlapped areas of the recombined beams represented by the apertures used on both sides of the prism. The amount of overlap may be determined by way of example by the thickness of the beam splitters and can be obtained by choosing the proper thickness. If angle errors only are present in the cube corner prism, the fringes will appear as straight lines within the overlapped area. The direction and number of fringes seen is a measure of twice the angle error of the cube corner prism for its particular orientation. This pattern may be observed for three 60°-spaced orientations of the cube corner prism as it is rotated in the plane of its face.

According to the present invention, the two interfering beams traverse the same optical path lengths (except for path length differences introduced by prism angle errors and optical inhomogeneity) with the result that the light beams being recombined are always in phase in the center of the overlapped apertures. It should be obvious that under such circumstances the wave length of the light source is not critical as would be the case if the path lengths of the two interfering beams were different. As a result, a non-expensive white light source may be used. Further, by reason of the fact that light rays in cube corner prisms have constant path lengths and are reflected parallel to the incident rays (except for the angle error being measured) regardless of the orientation and position of the test cube corner prisms, no adjustments have to be made (other than the non-citical aperture orientation) between successive prisms, thereby providing a great advantage for the production testing and measuring of cube corner prisms.

The pattern for the cube corner prisms for each orientation may be photographed or recorded in any other desirable manner. Moreover, a variable wedge angle measuring device may be inserted in one of the beams such that it may be oriented and adjusted until the fringe pattern disappears in succession for each 60° orientation of the cube corner prism. The orientation, or azimuth of the variable wedge angle prism corresponds to the direction of the angle error and the adjustment of the variable wedge angle prism corresponds to the magnitude of the angle error for each orientation of the cube corner prism.

Further, the teachings of the present invention may be used to produce a wedge angle measuring device if a perfect cube corner is used and the test wedge angle is inserted into one path of the two interfering beams in place of (or in addition to) the variable wedge angle. Under these conditions, the fringe pattern in the recombined beam is a measure of the test wedge angle.

It is therefore a primary object of the present invention to provide an improved interferometric method and means for determining the existence of angle error in a cube corner prism for a particular orientation.

It is another object of the present invention to provide an improved interferometric method and means for measuring and recording the magnitude and direction of the angle error of a cube corner prism for a particular orientation.

It is a further object of the present invention to provide an improved intereferometric method and means for measuring the angle error of a cube corner prism, which means is free from critical adjustments for a particular orientation.

It is still another object of the present invention to provide an improved interferometric means for measuring the angle error of a cube corner prism in which light path lengths are not critical.

It is another object of the present invention to provide an improved interferometric means for measuring the angle error of a cube corner prism in which a white light source may be used.

It is still another object of the present invention to provide an improved interferometric means for measuring both the direction and magnitude of the angle error of a cube corner in numerical terms for a particular orientation.

It is an additional object of the present invention to provide an improved interferometric means for measuring wedge angles.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which:

FIGS. 4A, 4B and 4C illustrate diagrammatically the fringe pattern produced in making measurement with the apparatus shown in FIG. 3;

Figure 1A:
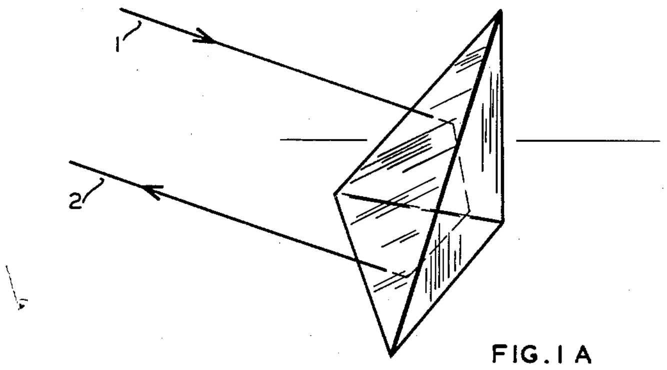
FIG. 1A illustrates a perspective view of a cube corner prism with an incident light ray normal to its face.
Figure 1B:
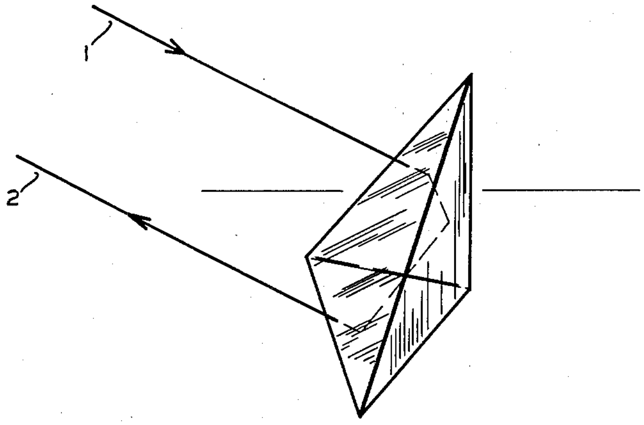
FIG. 1B illustrates a perspective view of a cube corner prism with an incident light ray other than normal to its face.

As already suggested, the cube corner prism is a very important reflective component in the field of optics. The primary reason for this is that light rays passing through the face of the cube corner and striking the three mutually perpendicular reflecting surfaces in succession will return in a path which is parallel to its original direction in a manner which is substantially independent of the orientation of the cube corner prism with respect to the incident light ray. FIG. 1A illustrates a perspective view of a cube corner with an incident light ray 1 entering its face in a manner such that it is perpendicular to that surface. If the cube corner has mutually perpendicular reflective sides, the reflected ray 2 will be parallel with the incident ray 1. The dotted lines in FIG. 1A indicate that the light ray 1 strikes a first reflective surface and is reflected in accordance with the law of reflection which states that the reflected light ray makes the same angle with the normal to a surface as does the incident light ray, and furthermore, the incident light ray, the reflected light ray and the normal to the surface all lie in the same plane. The dotted line further shows how the light ray is subsequently reflected at the second and third reflective surfaces in accordance with the law of reflection. After the third reflection, the light ray is travelling parallel and in the opposite direction to its path prior to the first reflection, emerging from the face of the prism as light ray 2 parallel to light ray 1. FIG. 1B illustrates the cube corner of FIG. 1A in perspective but reoriented such that the incident light ray 1 is no longer perpendicular to its face. However, if the incident light ray 1 successively strikes the three reflective surfaces of the cube corner and these surfaces are mutually perpendicular, the reflected ray 2, will remain parallel to the incident ray 1 even though the angle of incidence has changed, thereby illustrating the desirable characteristic of cube corner prisms. The dotted lines in FIG. 1B indicate how the light ray 1 strikes the first, second and third reflective surfaces successively in a manner similar to that described in connection with FIG. 1A.

Figure 1C:
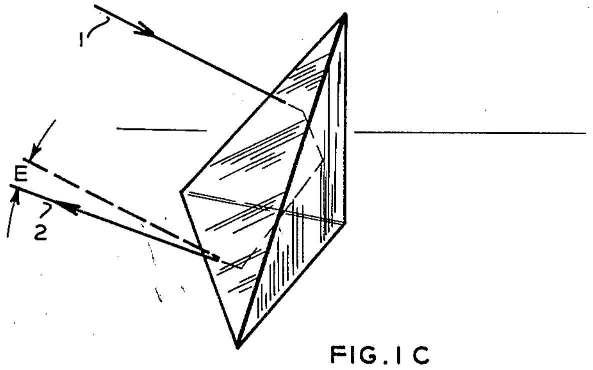
FIG. 1C illustrates a perspective view of a cube corner prism and the effect of angle error on an incident light ray.

Any deviation of the three reflective surfaces from the condition of being mutually perpendicular gives rise to a non-parallelism between the incident and reflective rays which has heretofore been defined as angle error. This is illustrated in FIG. 1C. FIG. 1C, like FIG. 1B, illustrates a perspective view of a cube corner with the incident ray 1 entering the face of a cube corner. Unlike the cube corner of FIG. 1B, however, one or more of the vertex angles of the cube corner shown in FIG. 1C does not equal 90 degrees. The reflected ray 2 is shown making an angle with a parallel to the incident light ray 1 thereby illustrating the magnitude of the angle error E.

Figure 2:
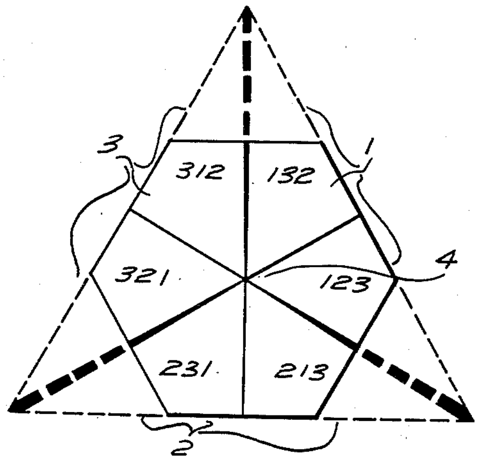
FIG. 2 illustrates the effective area of the face of a cube corner prism as represented by kite apertures which is helpful in describing the present invention.

FIG. 2 illustrates a view of a cube corner looking straight into the face, with three mutually perpendicular reflective surfaces 1, 2 and 3 forming a vertex at 4. The face of the cube gives the appearance of an equilateral triangle. Incident light rays passing through the face of the cube corner represented by the plane of the paper will typically strike each of the reflective surfaces successively and then be reflected out parallel to the incident rays. An exception exists when the light rays pass through the face at very large variations from the perpendicular or too near one of the corners of the face since after their reflection from either the first or second reflective surfaces, they impinge upon the face before striking the remaining reflective surface or surfaces and become ineffective. For these reasons, the effective area of the face for passing incident light rays as seen in FIG. 2 gives the appearance of a hexagon. In some optical applications the ineffective corners are removed giving the face of the cube corner the physical appearance of a hexagon also.

Further, if one were to look directly into the face of a cube corner with its ineffective corners removed, it would appear as if the intersections between reflective surfaces 1 and 2, between reflective surfaces 2 and 3 and between reflective surfaces 3 and 1 were extended so that each bisects the remaining reflective surfaces. Actually, what appear to be extensions of the lines of intersection are really the optical image of the lines of intersection of the reflective surfaces. (It should be remembered that the image will appear as the cube corner intersections are rotated by 60 degrees.) Thus, the hexagon appears to be divided into the six kite apertures shown in FIG. 2. Each kite aperture contains a three digit number indicating the order with which an incident light ray passing through that particular kite aperture will strike the reflective surfaces 1, 2 and 3 before passing back through the face in a direction which is substantially parallel to the incident ray. As already indicated, the existence of angle error (non-mutual perpendicularity of the reflective surfaces) will result in the reflected ray not being parallel with the incident ray. For a given condition of non-mutual perpendicularity of the three reflective surfaces, different orders with which the reflective surfaces are struck may result in different angle errors.

Referring again to FIG. 2, one of the kite apertures indicates that incident light rays passing through there will strike reflective surfaces 3, 1 and 2, in that order, and if the reflective surfaces are not mutually perpendicular, these reflected light rays passing back through the face will have a characteristic angle error which may be represented by a vector the length of which is a measure of the magnitude and the direction of which represents its orientation. The vector representation of angle error will be set forth in more detail hereinafter. The adjacent kite aperture of FIG. 2 indicates that incident light rays passing through there will strike reflective surfaces 1, 3 and 2, in that order, and if the reflective surfaces are not mutually perpendicular the reflected light rays will be non-parallel with the incident rays when passing back through the face. This angle error will be characteristic for that order of striking the reflective surfaces for the particular prism. The next adjacent kite aperture of FIG. 2 indicates that incident light rays passing through there will strike reflective surfaces 1, 2 and 3, in that order, and if the reflective surfaces are not mutually perpendicular, the reflected light rays will be non-parallel with the incident rays when passing back through the face. This angle error will be characteristic of that order of striking the reflective surfaces for that particular prism.

As already indicated above, for a given condition of non-mutual perpendicularity (one particular prism) the angle errors for the reverse order of striking the three reflective surfaces will be the same as the forward order of striking. For example, the resulting angle error for light rays entering kite aperture 213 and striking the reflective surfaces in that order will be the same as the angle error for light rays entering kite aperture 312. Likewise, light rays entering kite aperture 231 have the same angle error as light rays entering kite aperture 132, and light rays entering kite aperture 321 have the same angle error as light rays entering kite aperture 123. The correspondence between the angle errors in light rays entering diametrically positioned kite apertures is the result of optical symmetry. Likewise, for the same reasons, if a cube corner prism is successively reoriented by 60 degree increments three times in the plane parallel to its face, the same bundle of light rays will pass through successive adjacent kite apertures such as those identified in FIG. 2 as 312, 132 and 123. Depending on the non-perpendicularity of these three reflective surfaces 1, 2 and 3, the angle error and its vector representation may well differ for each orientation as in the above analysis. Moreover, the optical symmetry heretofore described indicates that the angle errors represented as vector quantities encountered by the same bundle of incident light rays passing through adjacent kite aperture when the cube corner is in the first three orientations will completely identify the non-mutual perpendicularity of the reflective surfaces without further reorientation.

Thus, the present invention provides for identifying and measuring these error quantities in test cube corner prisms in order that angle error in cube corners may be considered for both their production and matching in practical applications.

Figure 3:
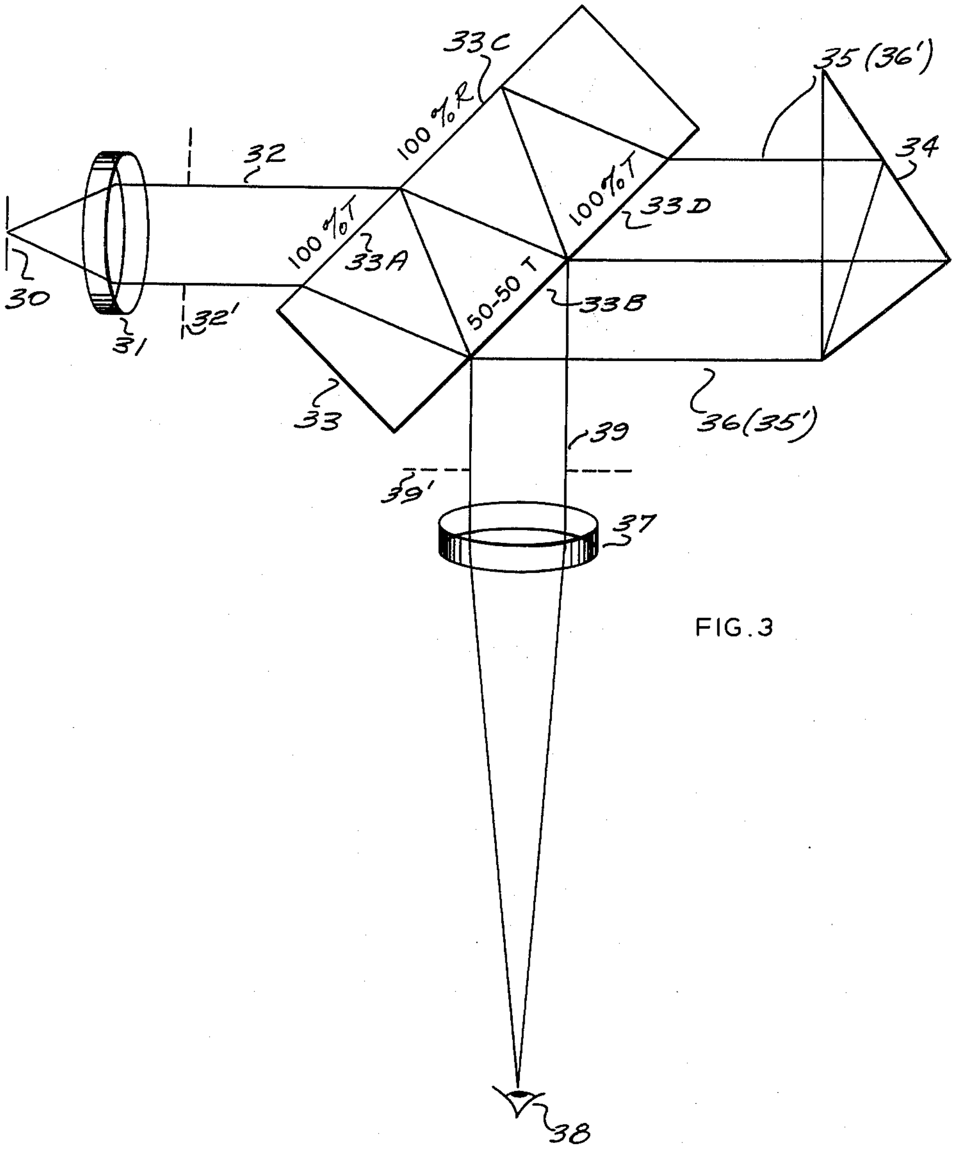
FIG. 3 is an optical schematic illustrating an interferometric measuring device according to the present invention.

Referring to FIG. 3, the output of a light source 30 is passed through a collimating lens 31 to form a light beam 32 with parallel rays. This light beam is then passed through a beam splitter 33 whose parallel surfaces have approximately the reflective qualities indicated by the respective legends. For example, 100%T means that substantially all of the light which impinges on that surface in either direction passes on through without reflection; 100%R means that substantially all of the light impinging on that surface in either direction is reflected typically by the surface; and 50–50T means that approximately half of the light impinging on that surface in either direction is reflected normally to the surface and the rest passes through. Thus, approximately all of light beam 32 passes through surface 33A to surface 33B, where half of the light beam passes through as light beam 36. The remaining light energy is reflected to surface 33C where practically all of it is reflected toward surface 33D which passes out substantially all of the light energy as light beam 35. As shown, both of these light beams pass along substantially parallel paths toward test cube corner 34. Remembering that it is the fundamental principle of the present invention to pass these two light beams 35 and 36 through the test cube corner in opposing directions, light beam 35 will be reflected back toward the beam splitter 33 over substantially the same path used by incident light beam 36 and substantially parallel with its incident light beam. Any variation of reflected light beam 35′ from the path of incident beam 36 will be indicative of the fact that it is not parallel with its incident beam as a result of angle errors. Likewise, light beam 36′ will be reflected back toward the beam splitter 33 over substantially the same path used by incident light beam 35 and substantially parallel with its incident light beam. Any offset of reflected light beam 36′ from the path of incident beam 35 and variation from being parallel with its incident beam will be due to angle errors. Substantially all of reflected light beam 36′ passes through surface 33D of beam splitter 33 and is substantially totally reflected by surface 33C back to the half-reflecting recombining surface 33B. Reflected light beam 35′ also impinges on half-reflecting surface 33B. In this manner approximately half of reflected light beam 35′ and approximately half of reflected light beam 36′ are recombined and passed as one light beam 39 through collimating lens 37. This recombined beam will exhibit an interference pattern which is characteristic of the angle errors of the test prism. It is important to note that the thickness of beam splitter 33 is so selected in the embodiment of FIG. 3 that the centers of beams 35 and 36 are separated by a distance substantially equal to the length of a kite aperture of the cube corner prism. This length is equal to $\sqrt{2/3}$ times the altitude of the cube corner prism (distance between its face and its apex). As a result of this selected thickness of beam splitter 33, the desired degree of registry or amount of overlap of apertures via beams 35′ and 36′ occurs when recombined on surface 33B into light beam 39. The selection of the thickness of the beam splitter is a matter of choice, as there might well be some practical applications of the present invention wherein it would be desirable to modify the thickness and alter the degree of registry or overlap referred to above. It should further be observed that other well known optical components (such as an inclined parallel plate, for example) may be utilized to alter the registry or overlap, as exemplified hereinafter.

The cross-section of light beam 32, the split beams 35 and 36 and the recombined beam 39 may be determined by placing an aperture as shown at 32′ or 39′. Only one of these apertures is required in order that the light beams be considered limited in cross section as shown in FIG. 3.

By reference to both FIGS. 2 and 3 it may be observed that incident light beam 35 will enter the kite aperture shown on the left side of FIG. 2, providing test cube corner prism 34 of FIG. 3 has the orientation of reflective surfaces 1, 2 and 3 shown in FIG. 2. Further, it may be observed that under the same conditions incident light beam 36 will enter the kite aperture on the right side of FIG. 2. The cross section of the bundles of light rays entering each of the kite apertures will be determined by the cross-section of the incident light beams. Analyzing the incident light beams 35 and 36 in terms of entry kite apertures for a test cube corner oriented as shown in FIG. 2, incident light beam 35 will enter through kite apertures 312, 321 and 231, while incident light beam 36 will enter through kite apertures 132, 123, and 213. The kite aperture designations or identifications for the reflected light beams 35′ and 36′ are just the reverse of those indicated in FIG. 2 for the same cube corner prism orientation, since the kite for an exit bundle of light rays is diametrically positioned with respect to the kite for the incident bundle of the same light rays. The recombined light beam 39 will be made up of reflected light beams 35′ and 36′ and will have the same kite apertures as the component light beams 35′ and 36′, but will be seen in reversed orientation due to the reflection of light beams 35′ and 36′ by surfaces 33B and 33C, respectively. This reversed orientation interchanges the designations or identifications of the kites—right and left. The two changes in kite designations or identifications just stated are the result of repositioning of the kites in the visual field due to the several optical reflections experienced by the bundles of light rays identified with these kites. Together, these two changes in kite position (due to reflections) are equivalent to one change which inverts the kite hexagon—top to bottom—without changing right and left.

For purposes of analysis of the recombined beam it is helpful to overlap two hexagons representing the face of a test cube corner prism oriented as shown in FIG. 2, as seen from the eye position 38 through lens 37. Referring to FIG. 4A the hexagon on the left represents the face of the test cube corner as seen by the reflected light beam 36′, and the hexagon on the right represents the face of the test cube corner as seen by the reflected light beam 35′. It should be noted that the registry of apertures shown in FIG. 4A results from the selection of a particular thickness of beam splitter proportional to the altitude of the cube corner prism as previously explained. With a thicker beam splitter, the hexagonal apertures of beams 35′ and 36′ would be farther apart, resulting in reduced overlap. The converse would be true for a thinner beam splitter.

FIG. 3 illustrates the selection of the thickness of the beam splitter 33 such that the hexagons overlap by a distance equal to a side or half diagonal of one of the hexagons. Each of the six incident light beams passing through the cube corner prism will be subjected to angle errors if the reflective surfaces of the prism are not mutually perpendicular. As discussed above, relative to FIG. 2, the angle error between incident and reflected light rays making up a light beam may be analyzed in terms of kite apertures, since the order with which the reflective surfaces of the cube corner prism are struck selects the angle error from the six possible values (each of three being equal and opposite to one of the remaining three angle errors) associated with any given condition of non-mutual perpendicularity of the reflective surfaces. It will be recalled that each of the six entry kite apertures represents a characteristic order of entry rays to strike the reflective surfaces of the cube corner. However, because of optical symmetry, three of these kite apertures merely represent the reverse order of reflective surfaces characteristic of the other three kite apertures for which the angle error will be equal and opposite to that for the forward order. Thus the reflection of a light beam passing through the face of a cube corner prism may be subjected to but three different angle error magnitudes.

Since each of the two reflected light beams which passed through the test cube corner prism in opposing directions contains three different angle errors, the recombined beam 39 contains seven corresponding interference patterns (one for each combination of overlapping kites) commensurate with the angle errors in the prism. The horizontal diamond aperture shown in FIG. 4A illustrates one of these interference patterns formed on the test cube corner prism and observed in the recombined beam 39 for the amount of overlap of the hexagons resulting from the relativve dimensions and orientation shown in FIG. 3. In each of the areas shown within the vertical diamond-shaped overlapped portions of the hexagons, one bundle of reflected light rays, characterized by a certain order of striking the reflective surfaces, is recombined with another bundle of light rays, characterized by a different order of striking the reflective surfaces. It should be noted that within the small horizontal diamond-shaped center area, each of these two characteristic orders of reflection is the reverse of the other, which, as indicated above, results in equal and opposite angle errors for these two bundles of reflected rays. Therefore, the fringe pattern formed in this center diamond is commensurate with twice this angle error.

Referring again to FIG. 3, the overlap of the hexagons and observed width of the aperture coincide. However, if it is desired that a smaller portion of the overlapped area be observed, the size and/or shape of apertures 32′ or 39′ may be altered, as should now be apparent to those skilled in the art.

While the are plural areas within the large vertical diamond shown in FIG. 4A, and while each may contain fringe patterns commensurate with the angle error in the reflective bundles of light rays being recombined therein, and while by correlation of all of these fringe patterns a complete analysis may be made of the non-mutual perpendicularity of the reflective surfaces of the test cube corner, as a practical matter, it is only in the center or smaller diamond portion (wherein fringe lines are shown in FIG. 4A) of the total overlapped area that a fringe pattern is readily discernible by the eye 38 of FIG. 3. Unfortunately, as a result of polarization effects inherent in the optical system disclosed herein, the fringe contrast is insufficient to be useful in the areas outside of the aforementioned small center diamond unless resort is made to techniques beyond the scope of the present invention. The fringe contrast within the small center diamond, however, is good with the system disclosed herein.

As already indicated above, each angle error in a cube corner prism may be represented by a vector, the length of which is commensurate with the magnitudes of the angle error and the direction of which is parallel to the directions of tilt of the emergent light ray with respect to the incident light ray. Referring to the small center diamond in the overlapped section of FIG. 4A, vector *a* is shown as representing the angle error incurred by a bundle of light rays striking reflective surfaces 1, 2 and 3 in that order, and the vector *b* is shown as representing the angle error incurred by a bundle of light rays striking reflective surfaces 3, 2 and 1 in that order. As a result of these angle errors in the light rays of the recombined beam, the light fringes shown in the small center diamond will be formed. These fringes are essentially perpendicular to the vector difference between vectors *a* and *b*, and the distance between adjacent fringes is inversely proportional to the vector difference between vectors *a* and *b*. The vectors *a* and *b* have been drawn to an arbitrary scale for purposes of illustration. The vectors *a* and *b* shown in the small diamond of FIG. 4A are equal and opposite, as each represents the angle error resulting from light rays striking the reflective surfaces in the reverse order as the other one. In the other areas of overlap within the larger diamond, any vectors correspopnding to *a* and *b* would probably not be equal and opposite, since different orders of striking the reflective surfaces are involved.

Figure 7A:
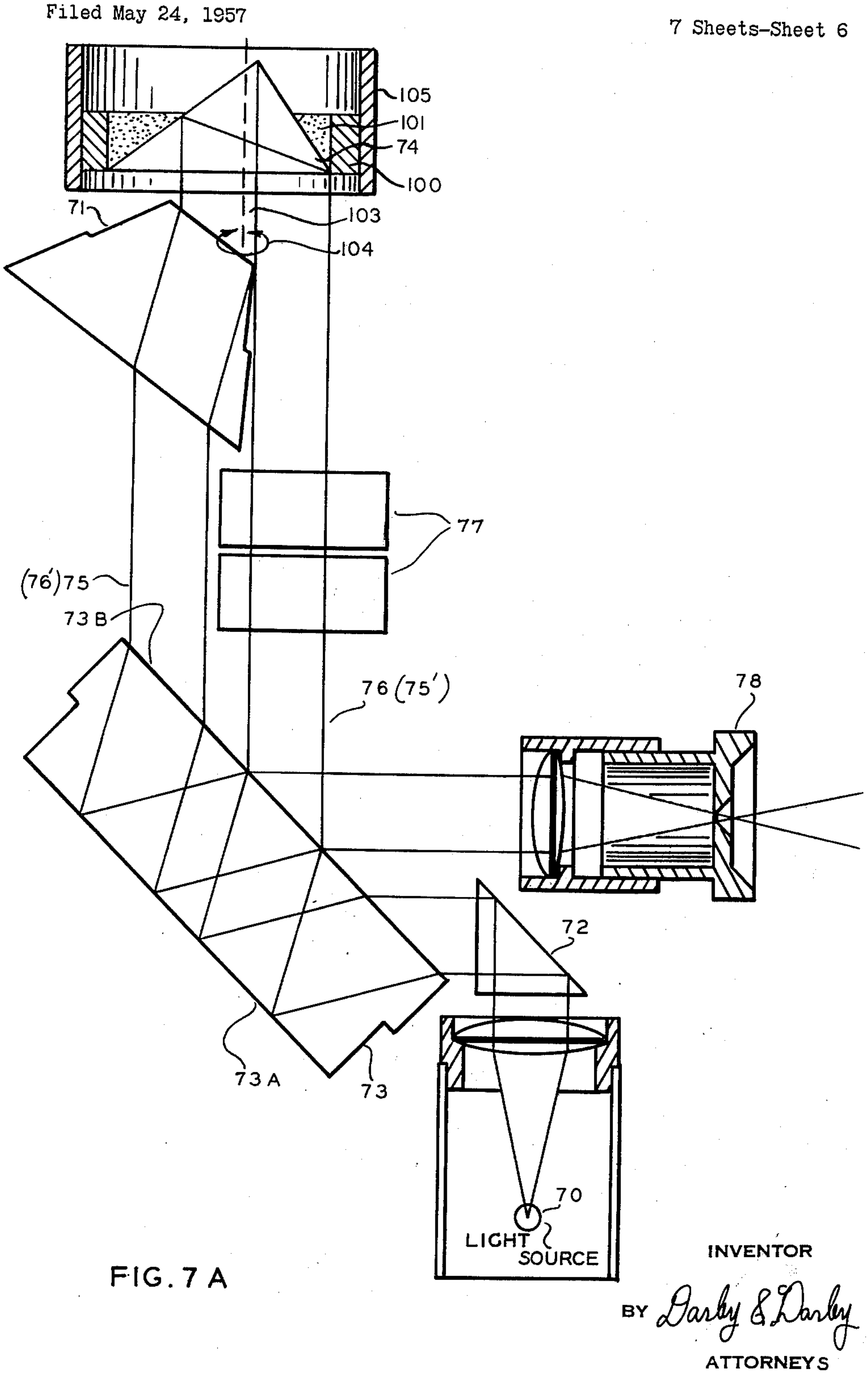
FIGS. 7A and 7B are each optical schematics illustrating further modifications of the interferometric measuring device of FIG. 3.

Thus FIG. 4A illustrates a fringe pattern commensurate with the angle error associated with light rays entering either kite aperture 123 or kite aperture 321 of FIG. 2 when the test cube corner prism of FIG. 3 has the orientation shown in FIG. 2. However, if the test prism of FIG. 3 is rotated clockwise in the plane of its face by 60 degrees, the small center diamond seen in the recombined beam 39 and shown in FIG. 4B, will contain bundles of light rays which entered through kite apertures 132 and 231. The bundles of light rays entering each of these kite apertures will strike the reflective surfaces in the reverse order. However, it should be noted that this order of reflection of these bundles of light rays is different than those shown in FIG. 4A, and, therefore, will probably result in an altered fringe pattern, such as that shown in FIG. 4B. Vector *c* is shown as representing the angle error incurred by a bundle of incident light rays striking reflective surfaces 1, 3 and 2 in that order, and vector *d* is shown as representing the angle error incurred by a bundle of light rays striking reflective surfaces 2, 3 and 1 in that order. Similarly to FIG. 4A, these fringes will be perpendicular to the vector difference between vectors *c* and *d*, and the distance between adjacent fringes is inversely proportional to the vector difference between vectors *c* and *d* by the same principle used in connection with FIG. 4A. The vectors *c* and *d* in FIG. 4B have also been drawn to an arbitrary scale for purposes of illustration. Since the interfering bundles of light rays strike the reflective surfaces in the reverse order, vectors *c* and *d* are equal and opposite. The test prism of FIG. 3 and of subsequent figures may be adapted to be rotated as described above by many means well known to those skilled in the optical art. For instance, as shown in FIG. 7A, test cube corner prism 74 may be cemented into a ring 100 by means of, say, balsam cement 101, and ring 100 may be adapted to rotate within tube 102 about axis 103 as shown by arrow 104, it being understood that ring 100, tube 102, and the arrangement thereof and coaction with test tube corner prism 74 are merely exemplary of many expedients for rotatably mounting prism 74 which will occur to those having ordinary skill in the art.

Thus, FIG. 4B illustrates a fringe pattern commensurate with the angle error associated with light rays entering either kite aperture 132 or kite aperture 231 when the test cube corner prism in FIG. 3 is oriented as set forth above. Moreover, if the test prism of FIG. 3 is further rotated clockwise in the plane of its face by an additional 60 degrees, the small center diamond seen in the recombined beam 39 and shown in FIG. 4C will contain bundles of light rays which entered through kite apertures 213 and 312. It should be noted that the order of reflection of these bundles is different than those shown in either FIG. 4A and 4B above, and therefore, probably will result in an altered fringe pattern such as that shown in FIG. 4C. Vector *e* is shown as representing the angle error incurred by a bundle of incident light rays striking reflective surfaces 2, 1 and 3 in that order, and vector *f* is shown as representing the angle error incurred by a bundle of incident light rays striking reflective surfaces 3, 1 and 2 in that order. As in FIG. 4A and 4B the vectors *e* and *f* have been drawn to an arbitrary scale in FIG. 4C for purposes of illustration. Since the interfering bundles of light rays strike the same reflective surfaces in the reverse order, vectors *e* and *f* are equal and opposite to each other. Thus FIG. 4C illustrates a fringe pattern commensurate with twice the angle error associated with light rays entering either kite apertures 213 or 312, when the test cube corner prism in FIG. 3 is oriented as set forth above.

In summary it would appear that the angle error illustrated in the small center diamond of FIG. 4A, 4B and 4C above may be represented for each of the three orientations as either a visual fringe pattern or as a vector difference of vectors *a* and *b*, vectors *c* and *d*, and vectors *e* and *f* respectively. Further, because of optical symmetry, the fringe patterns or their vector equivalents for any three adjacent orientations will completely identify the resulting angle errors in light rays striking the three reflective surfaces of a test cube corner prism as a result of the non-mutually reflective surfaces.

Figure 6A:
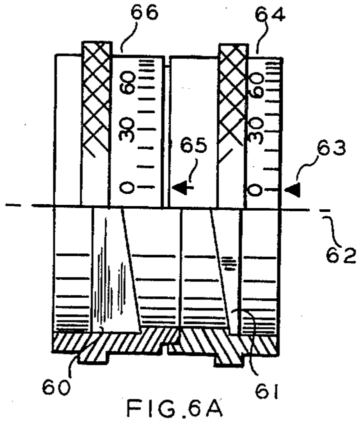
FIGS. 6A, 6B and 6C illustrate the construction and operation of a variable wedge angle device known as a Risley prism.
Figure 6B:
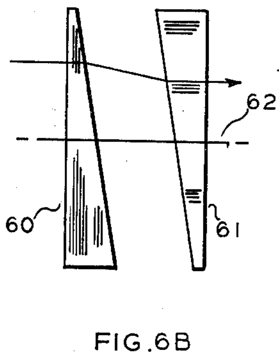
Figure 6C:
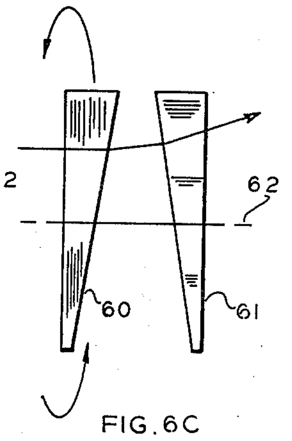
Figure 5A:
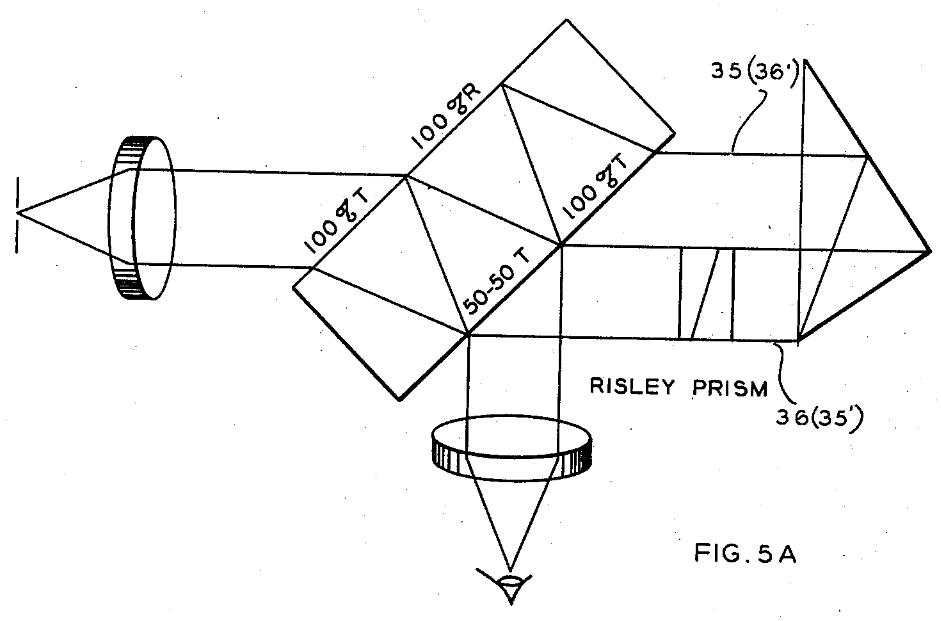
FIGS. 5A and 5B are each optical schematics illustrating modifications of the interferometric measuring device of FIG. 3 in accordance with the present invention.

In order that the fringe patterns illustrated in FIGS. 4A, 4B and 4C may be converted into the corresponding vector quantities, for the angle errors, a variable wedge angle device may be inserted into one of the parallel paths 36 (35') or 35 (36') of FIG. 3. Such a combination is shown in FIG. 5A wherein a variable wedge angle device exemplified by what is known as a Risley prism is inserted into parallel path 36 (35'). In all other respects FIG. 5A is identical with FIG. 3. The Risley prism is shown in considerably more detail in FIGS. 6A, 6B and 6C. Broadly speaking, the function of this variable wedge angle device is to deviate or bend both of the parallel light beams 35' and 36 by a measurable vectorial amount which is equal in magnitude and opposite in direction to one half of the vectorial difference in deviation incurred by two light beams passing through apertures (of the test cube corner prism) which overlap as shown in FIG. 4A. Thus, when the variable wedge angle device is adjusted to be equal to the magnitude of the error angle for a particular diametrical pair of kites and is properly oriented as to the direction of the angle error for the particular orientation of the test cube corner prism, the fringe pattern observed in combined light beam 39 expands, the fringe separation increasing until a single fringe covers the small central diamond area. As shown in FIG. 6B, a variable wedge angle device such as the Risley prism may comprise two optical wedges 60 and 61 whose orientation with respect to one another about an axis 62 may be altered through 360 degrees or less. As shown in FIG. 6B (with angles exaggerated for clarity of illustration) a light ray passing through wedge 60 is bent in a particular manner, and when the same light ray passes through wedge 61, it is bent in an equal and opposite manner, resulting in a zero net bending. However, in FIG. 6C wedge 60 has been rotated by 180 degrees, so that a light ray passing through wedge 60 is bent by the amount shown and on passing through wedge 61 this same light ray is bent in the same direction by an additional equal amount, the combined deviation representing the maximum bending or error angle measurable by the device. At any angular rotation of wedge 60 with respect to wedge 61 about the axis 62 between these two values of zero and 180 degrees; the amount of bending provided by the variable wedge angle device will be essentially a sine function of half of that angle of rotation. Moreover, if both wedges 60 and 61 are rotated together about axis 62, their relative positions remaining the same, the direction of this bending may be controlled. A practical arrangement for making these adjustments is shown in FIG. 6A where wedge 61 is mounted in cylinder 64 which has a scale thereon calibrated in degrees to measure its angular rotation about axis 62 against a fixed index 63. Rotation of cylinder 64 will, by reason of suitable friction connection, drag along coaxial cylinder 66, in which is mounted wedge 60, thereby rotating both wedges 60 and 61 about axis 62 and altering the direction of the bending of the variable wedge angle device. Moreover, if coaxial cylinder 66 is rotated and cylinder 64 is held fixed, the component wedges 60 and 61 change their relative orientation. At any setting, the reading of the scale on cylinder 66 against reference mark 65 on cylinder 64 represents the magnitude of the bending provided by the variable wedge angle device.

By using such a device in one of the parallel paths as exemplified in FIG. 5A, and by making the necessary adjustments of the rotational position of both wedge 60 and wedge 61 together and the rotational position of wedge 60 relative to wedge 61, the fringe pattern that appears in the small center diamond as shown in FIGS. 4A, 4B or 4C may be eliminated, inasmuch as a light ray bending action is introduced which is equal and in opposition to the corresponding angle error present as represented by each of these figures. As will be recalled, each of these figures represents a different orientation of the test cube corner prism, and for most conditions of non-mutual perpendicularity of the reflective surfaces will result in a different fringe pattern in the small center diamond for each of the three orientations. The two readings (magnitude and direction) as determined by the variable wedge angle device for each of the three orientations of the test cube corner prism will completely define non-perpendicularity of the reflective surfaces of the test cube corner. As will be apparent the advantages of the embodiment of FIG. 5A, over FIG. 3 in reducing the angle errors of the test cube corner of numerical quantities are great whether the measurement is being made for purposes of cube corner prism manufacturing or for matching. However, it should be emphasized that the Risley prism type variable wedge angle device shown herein is exemplary only, as many equivalent variable deviation angle devices are available.

Figure 5B:
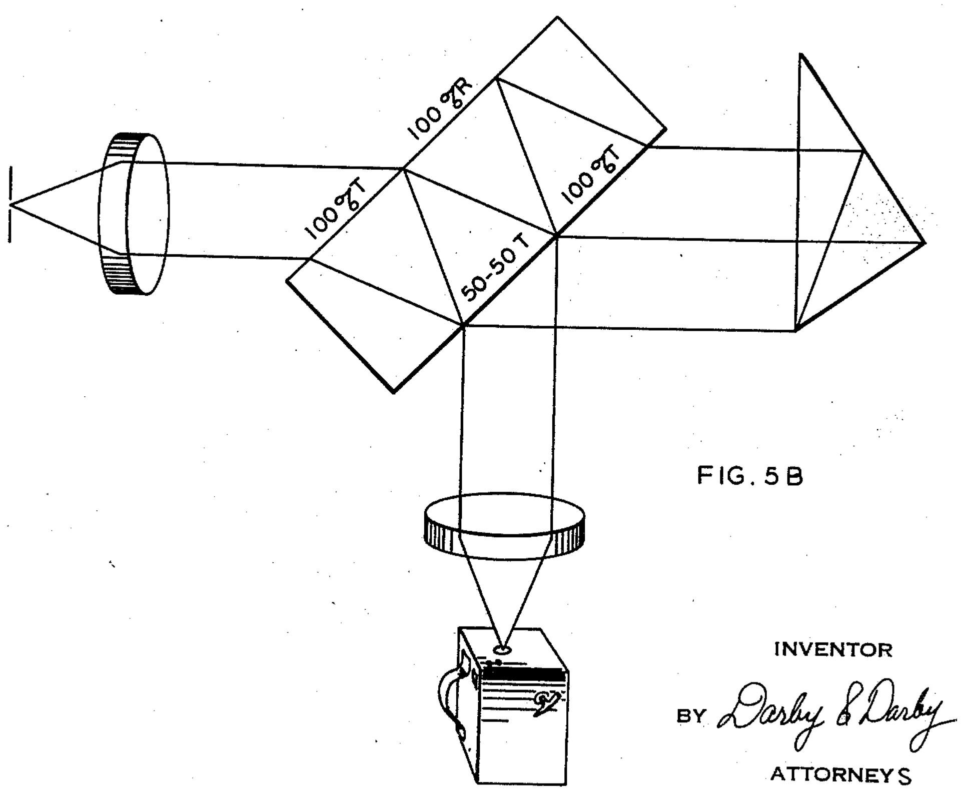

One advantage of the embodiment of FIG. 5A over that of FIG. 3 was that the numerical quantities representing angle error obtained for each orientation of the cube corner prism can be easily recorded. However, it should be pointed out that an operator might make a record of his observation using the apparatus of FIG. 3 by sketching the fringe patterns observed in the small center diamond for each orientation of the cube corner prism as shown in FIGS. 4A, 4B and 4C. Or, if this is not desirable, a camera may be used as shown in FIG. 5B to photograpn the fringe patterns noted in the small center diamond for the several orientations, thereby providing a permanent record of the angle errors present in the test cube corner prism. Whatever the techniques adopted in recording the fringe patterns observed, the information obtained may be used in the manufacture of cube corners with a minimum of angle error and/or the matching of plural cube corner prisms in optical apparatus to minimize the effects of angle error. Exemplary techniques for matching have been described above.

FIG. 7A illustrates a practical embodiment of the present invention, indicating solutions to several problems which may arise in practicing the present invention. One of these problems is that if a variable wedge angle device 77 like a Risley prism is inserted into one of the paths as shown in FIG. 7A and FIG. 5A, the parallel path for the two incident light beams must be separated by an amount depending on the construction of the variable wedge angle device in order to provide clearance. Further, it is desirable to be able to use the full aperture in hexagon cross-section of the test cube corner prism in making the determination of angle errors. For this reason a critical selection of the width of beam splitter 73 is made in order that the incident light beams 75 and 76 have the necessary separation shown in FIG. 7A and further, an optical element 71 known as an aperture shifter may be introduced to bend incident light beam 75 after it has passed the variable wedge angle 77, so that the beam passes through the face of the test cube corner prism parallel and adjacent to incident light beam 76. In this way, the complete aperture of the test cube corner prism 74 may be utilized. The construction of the device used as an aperture shifter herein, except for a limitation which will be set forth below, is largely a matter of choice as long as its dimensions are such as to give proper optical clearance.

The other limitation deals with the fact that the entry and exit surfaces of the aperture shifter must be parallel. Otherwise, this element will introduce a deviation angle affecting the fringe pattern observed in the recombined beam, thereby detracting from the accuracy of the angle error measuring qualities of the combination of FIG. 7A. In order to discover the contribution of light fringes from this possible deviation angle source the aperture shifter must be physically constructed about an axis such that when it is rotated about this axis by approximately 180 degrees, it will have an equal wedge angle of opposite sign if one does exist by reason of the fact that entry and exit surfaces are non-parallel. When an aperture shifter is of such construction its contribution to the fringe pattern of the recombined light beam may be easily determined by observation of the fringe pattern for the two orientations of the aperture shifter. Likewise, if reflecting and half reflecting surfaces 73A and 73B, respectively, of the beam splitter 73 are non-parallel they also act as a wedge angle and contribute to the fringe pattern observed in the recombined beam 79, so as to detract from the cube corner prism angle error measuring ability of the overall combination. For this reason, the beam splitter 73 also should be constructed so that when rotated 180 degrees about its axis it will contribute equal wedge angles of opposite sign when reflective surfaces 73A and 73B are non-parallel. When the beam splitter is of such construction, its contribution to the fringe pattern may be observed by making this 180 degree rotation and noting the change in the light fringe pattern in the recombined beam. It was this particular construction requirement that dictated that the light beam from source 70 in FIG. 7A enter the beam splitter 73 through an essentially non-reflecting portion of surface 73B instead of entering through surface 73A in manner similar to the technique illustrated in FIGS. 3, 5A and 5B. It should be noted that the beam splitters shown in FIGS. 3, 5A and 5B do not possess an axis of symmetry about which they can be rotated 180°, and therefore, they do not provide a means for detecting the possible wedge angle contribution of the beam splitter to the fringe pattern appearing in the recombined beam of these figures. Aside from the introduction of the aperture shifter 71 and the different construction of the beam splitter 73, the construction and operation of the device of FIG. 7A is very similar to that of FIG. 5A. A light source 70 provides a light beam which is passed through a collimating lens and directed through surface 73B of the beam splitter which splits it into two incident beams of approximately equal intensity, which beams in turn pass through the test cube corner prism in opposing directions. The aperture shifter 71 is inserted in the path of one of these split incident beams, and a variable wedge angle device 77 is inserted in the path of the other one in the manner described above. The light beams reflected from the test cube corner prism are then recombined in the beam splitter 73 for viewing through eye piece 78. The component wedges of the variable wedge angle device 77 may then be rotated together and with respect to each other as described above to eliminate the fringe pattern observed through the eye piece 78. The aperture shifter 71 and beam splitter 73 may then be individually and successively rotated by about 180 degrees in order to determine the contribution they each might be making to the fringe pattern due to non-parallelism as discussed above. Using the same principle, the variable wedge angle device 77 can be tested (in its zero-deviation setting) by similarly observing whether the fringe pattern remains unchanged upon rotation of the whole variable wedge angle device approximately 180° about the beam axis 76 (75'). In addition to detecting any contribution to the resultant fringe pattern introduced by possible imperfections in the aperture shifter, beam splitter and/or variable wedge angle device, this procedure allows quantitative corrections to be made to measurements of test cube corner prisms, etc., as will be immediately obvious to those skilled in the art.

The techniques disclosed herein are not limited to measuring the lack of mutual perpendicularity in cube corner prisms but have obvious applications to other optical devices having at least mutually perpendicular reflective surfaces, such as dihedral prisms, and dihedral and trihedral mirror arrangements. Moreover, while the embodiments shown herein have been limited to applications using electromagnetic energy in the visible range, the techniques would also be usable for electromagnetic energy in other frequency ranges such as the infrared, ultraviolet, X-ray, communications and radar frequency ranges. For such applications the components utilized would have to be modified and adapted to the frequency spectrum selected. For example, broadly the beam splitter may be thought of as an electromagnetic energy divider and the fringes as interference maximums.

Figure 7B:
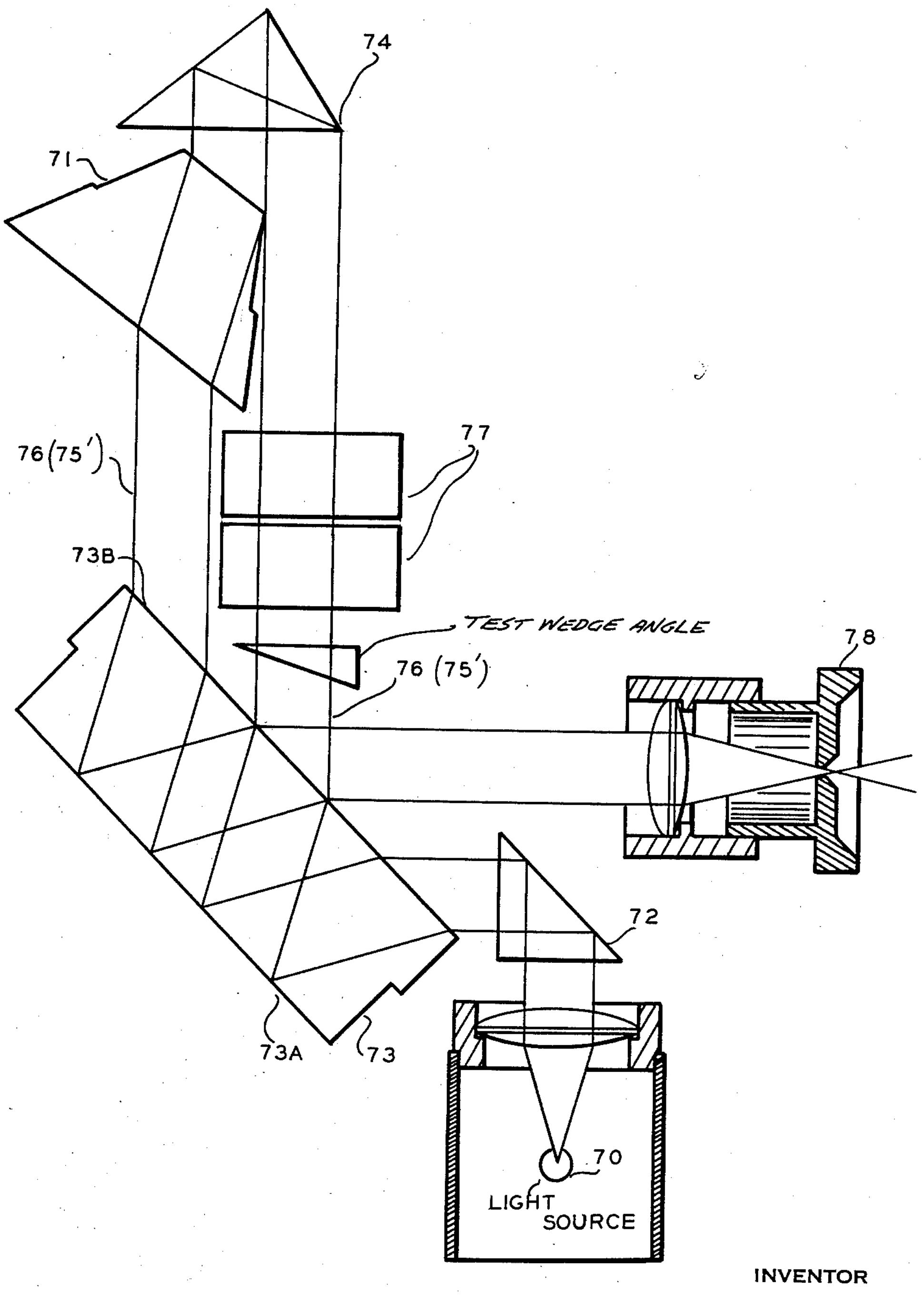

In addition to measuring the lack of mutual perpendicularity of reflective surfaces, the teachings of the present invention may be utilized to measure the deviation produced by a test wedge angle device inserted into one of the parallel light beam paths. Specifically, if a perfect cube corner prism, aperture shifter and beam splitter are used in the combination of FIG. 7A, and a test wedge angle device is inserted in place of the variable wedge angle device the fringe pattern in the recombined light beam will be determined by the magnitude and orientation of the deviation vector of the test wedge angle device. If it is desired to reduce the wedge angle measurement to numerical values, the Risley prism type device may be reinserted in addition to test wedge angle device and adjusted as explained above to make the fringe pattern disappear. Such a combination is shown in FIG. 7B. This variable wedge angle device may also be used to compensate for imperfections in the cube corner prism, aperture shifter, and beam splitter prior to insertion of the test wedge angle device. FIG. 7B is identical with FIG. 7A except that it illustrates the insertion of a test wedge angle device in addition to the variable wedge angle device 77 in path 76 (75'). Obviously the test wedge angle device could have been placed in the other path traversed by incident light beam 75 and reflected light beam 76'.

Moreover, if two variable wedge angle devices are placed in the same or different beams, one may be used to calibrate the other.

Moreover, if the above two variable wedge angle devices have different calibration factors such that one has a larger maximum deviation value than the other, the combination allows a magnification of angle to be achieved, since for a compensated condition of the fringes, one of the variable wedge angle devices will have been adjusted through a greater angle than the other. The test wedge angle device need not be of a nature such as to pass electromagnetic energy through its entire surface if a portion of the surface of the wedge angle device does pass electromagnetic energy, and this transparent portion is placed in one or both of the light paths.

Somewhat analogous to the insertion of a test wedge angle into one of the light paths of FIG. 7B according to the teachings of the present invention would be an arrangement in which one of the paths passes through a gas (such as air or other gas in a wind tunnel) where the gas density varies across the path. Under these circumstances and considering a perfect beam splitter, cube corner prism and aperture shifter or an adjustment on a variable wedge angle device correcting for an accumulated error resulting from these components, a fringe pattern will appear in the recombined beam commensurate with the variation of density across the cross section of the path. If both beams 75 (76') and 76 (75') traverse the gas to be examined, the resulting fringes will be characteristic of those generally known as "shearing" or "inverting" fringes. Various other "shearing" or "inverting" interferometers (not possessing the same features as those disclosed herewith) have been reported in the literature, exemplified by an article entitled "Wave Front-shearing Type of Interferometer," by W. J. Bates, which appeared on pages 940–950 of the Proceedings of the Physical Society (London), volume 59 (November 1947), and an article entitled "Construction of a Kösters Double-Image Prism and the Kösters Interferometer," by J. B. Saunders, which appeared on pages 21–31 of the Journal of Research, National Bureau of Standards, volume 58, January 1957.

Many modifications may be made in the above described embodiment without departing from the scope of the present invention. For example, the amount of apparent overlap of the hexagon apertures in the face of the cube corner prism as seen in the recombined beam may be altered by changing the thickness of either the beam splitter or the aperture shifter depending on the type of interference patterns desired. Moreover, the beam splitter, aperture shifter and variable wedge angle may vary considerably in construction within the limitations set forth above. For example, the beam splitter and aperture shifter may be made of more than one piece for ease in construction.

It will thus been that the objects set forth above, among those made apparent from the preceding description, are efficiently attained. Since certain changes may be made in carrying out the above method and in the constructions set forth without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention what we claim as new and desire to secure by Letters Patent is:

1. An interferometer comprising a source providing a light beam, beam splitting means placed in said light beam for splitting said beam into two parallel light beams, mount means for positioning an optical reflecting means to be tested, said optical reflective means being located and orientable such that the parallel light beams are each successively incident on and reflected from each of its reflective surfaces before being directed back toward said beam splitter means over the path of the other incident parallel light beam, said reflected light beams being recombined on said beam splitter forming overlapping images of said reflecting means, the area of overlap including fringe patterns commensurate with an bending of the light rays in the split light beams prior to recombination, and means for observing said light fringe patterns.

2. An interferometer comprising a light source providing a light beam, beam splitting means placed in said light beam for splitting said beam into two parallel light beams, an optical reflecting means to be tested having at least two mutually perpendicular reflective surfaces, said optical reflective means being located and oriented in a mount means such that the parallel light beams are each successively incident on and reflected from each of its reflective surfaces before being directed back toward said beam splitter means over substantially the path of the other incident parallel light beam, said reflected light beams being recombined on said beam splitter forming overlapping images of said reflecting means, the area of overlap including fringe patterns commensurate with any bending of the light rays in the split beams prior to recombination, and means for observing said light fringe patterns.

3. An interferometer comprising a light source providing a light beam, beam splitting means for splitting said beam into two parallel light beams, a cube corner prism to be tested, said cube corner prism being located and oriented in a mount means such that the parallel light beams are incident on and are passed through its face in opposing directions such that each is reflected back substantially over the path of the other incident light beam toward said beam splitter means, said reflected light beams being recombined on said beam splitter forming overlapping images of said cube corner prism, the central portion of said overlapping area fringe patterns commensurate with any bending of the light rays in the split light beams prior to recombination.

4. An interferometer comprising a source providing a beam of light, beam splitting means placed in said beam of light for splitting said beam into two parallel beams, a test cube corner prism oriented and positioned to pass said beams in opposing directions and reflect said light beams simultaneously back toward said beam splitting means, each reflected beam using the incident path of the other, said parallel beams recombining on said beam splitter and forming light fringes in said recombined beam commensurate with the angle errors of said test prism, and means for viewing said recombined beam and light fringes.

5. An interferometer comprising a source providing a beam of white light, beam splitting means placed in said beam of white light for splitting said beam into two parallel beams, a test cube corner oriented and positioned to pass said white light beams in opposing directions and reflect them simultaneously back toward said beam splitter, each reflected beam using the incident path of the other, said parallel beams recombining on said beam splitter and forming a light fringe in the recombined beam commensurate with the angle error of said test prism for said orientation, said two light beams also traversing the same path length between said beam splitter means and said test cube corner prism, means for viewing said recombined beam and light fringes, and variable optical wedge means placed in the path of one of the light beams and in the reflected path of the other such that it may be rotated and adjusted to eliminate the light fringes seen in the recombined beam thereby providing a measure of the direction and magnitude of the angle error of said cube corner prism for said orientation.

6. An interferometer comprising a source providing a beam of white light, beam splitting means placed in said beam of light for splitting said beam into two parallel beams, a cube corner prism without angle error oriented and positioned to receive and reflect said parallel light beams simultaneously back toward said beam splitter, each reflected beam using essentially the incident path of the other, said beams recombining on said beam splitter, said two light beams always traversing the same path length between said beam splitter means and said cube corner prism, a viewing means for visual inspection of said recombined beam, and means for inserting a test wedge angle means in the path of one of the light beams and in the reflected path of the other, thereby creating light fringes in the recombined beam commensurate with the bending effect of said test wedge angle.

7. An interferometer comprising a source providing a beam of white light, beam splitting means placed in said beam of light for splitting said beam into two parallel beams, a test cube corner prism with a given orientation and positioned to receive and reflect said parallel light beams simultaneously back toward said beam splitter each reflected beam using the incident path of the other, said light beams recombining on said beam splitter and forming a light fringe pattern in said recombined beam commensurate with the angular error of the prism in the given orientation, said two light beams always traversing the same path length between said beam splitter means and said cube corner prism and means for viewing said recombined beam and the light fringe pattern.

8. An interferometer comprising a source providing a beam of white light, beam splitting means placed in said beam of light for splitting said beam into two parallel beams, a test cube corner prism oriented and positioned to receive and reflect said parallel light beams simultaneously back toward said beam splitter each reflected beam using the incident path of the other, said parallel beams recombining on said beam splitter and forming a light fringe pattern in said recombined beam commensurate with the angular errors of the prism in the given orientation, said two light beams always traversing the same path length between said beam splitter and said corner cube prism, means for viewing said recombined beam and the light fringe pattern, and means for photographing said fringe pattern.

9. An interferometer comprising a light source providing a light beam, beam splitting means placed in said light beam for splitting said beam into two parallel light beams, an optical reflecting means to be tested having reflective surfaces the mutual perpendicularity of which is to be tested, said optical reflective means being located and oriented such that the parallel light beams are each successively incident on and reflected from each of its reflective surfaces before being directed back toward said beam splitter means over the path of the other incident light beam, said reflected light beams being recombined on said beam splitter forming overlapping images of said reflecting means, the area of overlap including fringe patterns commensurate with any bending of the light rays in the split light beams prior to recombination, means for observing said light fringe patterns, and a variable optical wedge angle means placed in the path of one of the incident light beams and in the reflected path of the other such that it may be located and adjusted to eliminate the light fringes observed in the recombined beam, thereby providing a measure of the direction and magnitude of any bending of the light rays in the split light beams prior to recombination.

10. An interferometer comprising a source providing a beam of light, beam splitting means placed in said beam of light for splitting said beam into two parallel beams, a test cube corner prism oriented and positioned to pass said light beams in opposing directions and reflect them simultaneously back towards said beam splitter, each reflected beam using the incident path of the other, said reflected beams recombining and forming light fringes in the recombined beam commensurate with the angle error of said test prism for said orientation, and a variable optical wedge angle device placed in the path of one of the incident light beams and in the reflected path of the other such that it eliminates the light fringes seen in the recombined beam thereby providing a measure of the angle error of said cube corner prism for said orientation.

11. An optical system for passing two incident light beams through a test optical reflective means having at least two substantially mutually perpendicular reflective surfaces in opposing directions with each reflected light beam passing substantially over the incident path of the other comprising a source providing a light beam, beam splitting means responsive to said light beam for spliting said beam into two incident light beams and recombining said light beams on their reflection, said recombined beam containing a light fringe pattern commensurate with any bending of the light rays in the split light beams prior to recombination, and a variable optical wedge angle device placed in the path of one of the incident light beams and in the reflected path of the other such that it may be rotated and adjusted to eliminate the light fringes seen in the recombined beam, said device being equipped with indicator means indicating its angular orientation about an axis parallel to said beams and the wedge angle to which it is set when said fringes are eliminated, thereby providing a measure of the direction and magnitude of any bending of the light rays in the split light beams prior to recombination.

12. An optical system for passing two incident light beams through a test cube corner prism oriented and positioned to pass the incident beams in opposing directions and reflect each simultaneously over the incident path of the other comprising, a source providing a light beam, beam splitter means placed in said light beam for splitting said light beam into two parallel incident light beams and recombining said incident light beams on their reflection, said recombined beam containing a light fringe pattern commensurate with any bending of the reflected light rays of one beam from the incident path of the other beam, as a result of angle error in the test cube corner prism for that orientation and a variable optical wedge angle device placed in the path of one of the incident light beams and in the reflected path of the other such that it may be rotated and adjusted to eliminate the light fringes seen in the recombined beam, said device being equipped with indicator means for indicating its angular orientation about an axis parallel to said beams and the wedge angle to which it is set when said fringes are eliminated, thereby providing a measure of the direction and magnitude of the agle error of said cube corner prism for said orientation.

13. An interferometer for passing two incident light beams which pass over identical optical paths through a test optical wedge angle device in order to form light fringes commensurate with the magnitude and orientation of the test optical wedge angle device comprising, a source providing a beam of light, a beam splitting means placed in said beam of light for splitting said beam into two parallel incident beams, a cube corner prism without angle error oriented and positioned to receive and reflect said parallel light beams simultaneously back toward said beam splitter each reflected beam using essentially the incident path of the other, said beams being recombined on said beam splitter, said recombined beams containing a fringe pattern commensurate wtih any bending of the light rays in the split light beams prior to recombination, a variable optical wedge angle device placed in the path of one of the light beams and in the reflected path of the other such that it may be rotated and adjusted to eliminate the light fringes seen in the recombined beam, said device including indicating means for indicating its orientation about an axis parallel to sad beams and its wedge angle, and said optical components being arranged such that a test wedge angle may be also inserted in one of the paths.

14. A measuring device comprising a source providing a beam of electromagnetic energy, energy dividing means placed in said beam for spliting said beam into two parallel incident beams, a reflective means with at least two mutually perpendicular reflective surfaces, said reflective means being located and oriented such that the parallel beams are each successively incident on and reflected from each of its reflective surfaces before being directed back toward said energy divider means over substantially the path of the other incident parallel beam, said reflected beams being recombined on said energy divider forming interference maximums in said recombined beam commensurate with any bending of the energy rays in the split beams prior to recombination, means for observing said pattern of fringe maximums and deviating means in one of said beams for deviating the beam by an indicated amount in a plane having an indicated orientation about an axis parallel to said beams.

15. A measuring device comprising a source providing a beam of electromagnetic energy, energy dividing means placed in said beam for spliting said beam into two parallel incident beams, a reflective means with at least two mutually perpendicular reflective surfaces, said reflective means being located and oriented such that the parallel beams are each successively incident on and reflected from each of its reflective surfaces before being directed back toward said energy divider for recombination into a recombined beam, said recombined beam containing a pattern of intereference maximums commensurate with any bending of the rays of energy in the split beams prior to recombination resulting from the fact that the reflective surfaces are not mutually perpendicular, and deviating means located in one of said beams for deviating the beam by an indicated amount in a plane having an indicated orientation about an axis parallel to said parallel beams.

References Cited in the file of this patent

UNITED STATES PATENTS

| | | |
|---|---|---|
| 2,481,551 | Williams | Sept. 13, 1949 |
| 2,545,340 | Bundy et al. | Mar. 13, 1951 |
| 2,571,937 | Peck | Oct. 16, 1951 |
| 2,583,596 | Root | Jan. 29, 1952 |
| 2,693,735 | Zehender | Nov. 9, 1954 |
| 2,795,991 | Tuzi | June 18, 1957 |

FOREIGN PATENTS

| | | |
|---|---|---|
| 555,672 | Great Britain | Sept. 2, 1954 |
| 950,413 | Germany | Oct. 11, 1956 |

OTHER REFERENCES

"Prism and Lens Making" (F. Twyman), second edition, 1952, published by Hilger & Watts, Ltd. (London), pages 446–448 relied on.